United States Patent
Kurosawa

(10) Patent No.: US 6,804,035 B2
(45) Date of Patent: Oct. 12, 2004

(54) LASER MACHINING APPARATUS

(75) Inventor: Miki Kurosawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/344,765

(22) PCT Filed: Mar. 23, 2001

(86) PCT No.: PCT/JP01/02350
§ 371 (c)(1),
(2), (4) Date: Feb. 14, 2003

(87) PCT Pub. No.: WO02/076668
PCT Pub. Date: Oct. 3, 2002

(65) Prior Publication Data
US 2003/0179430 A1 Sep. 25, 2003

(51) Int. Cl.[7] ............................................. G02B 26/08
(52) U.S. Cl. .......................................... 359/212
(58) Field of Search ................................. 359/212, 202; 356/398, 400

(56) References Cited

U.S. PATENT DOCUMENTS 5,854,803 A    12/1998  Yamakazi et al.
5,898,480 A    4/1999   Ozawa

FOREIGN PATENT DOCUMENTS

| EP | 884128 | 12/1998 |
|---|---|---|
| JP | Sho 62-220922 | 9/1987 |
| JP | Hei 1-127688 | 8/1989 |
| JP | 6-106370 | 4/1994 |
| JP | 10-296468 | 11/1998 |
| JP | Hei 10-328871 | 12/1998 |
| JP | 2001-96382 | 4/2001 |

*Primary Examiner*—Euncha P. Cherry
(74) *Attorney, Agent, or Firm*—Sughrue Mion, PLLC

(57) ABSTRACT

A laser beam machine according to the invention comprises a scanning lens for gathering laser light deflected by a deflection mirror on a workpiece for applying the laser light to a plurality of parts in a deflection area using the above-mentioned deflection mirror and the above-mentioned scanning lens and machining the workpiece. The laser beam machine comprises energy measurement means for measuring energy of the laser light applied to a plurality of different positions in the above-mentioned deflection area, so that the energy of the laser light applied to a plurality of different positions in the deflection area can be measured, occurrence of partial energy lowering depending on the laser light application position, caused by dirt of the scanning lens can be known, and appropriate maintenance is executed based on the information, whereby it is made possible to perform stable machining over a long term without causing a machining failure to occur.

10 Claims, 7 Drawing Sheets

LASER MACHINING APPARATUS

TECHNICAL FIELD

This invention relates to a machine and in particular to measurement of energy of laser light thereof.

BACKGROUND OF THE INVENTION

As for recent portable information electronic machines, etc., a build-up multi-layer circuit board comprising a plurality of conducting layers and insulating layers deposited on an electronic circuit board is used, whereby the circuitry is made denser and miniaturization of the machine is accomplished. In the build-up multi-layer circuit board, the insulating layer is formed with a large number of conducting holes called bias holes or through holes to bring wiring patterns of the conducting layers with the insulating layer between into conduction, and a machining method using laser light is used as a drilling method to make the conducting holes.

Such a laser beam machine for drilling a circuit board using laser light in a related art has a configuration as shown in FIG. 6. Laser light 2 emitted from a laser oscillator 1 is reflected by a pair of deflection mirrors, generally galvanometer deflection mirrors 5 (5a and 5b) and is gathered through a scanning lens 6 on the surface of a light-applied object, for example, a workpiece 4.

The galvanometer deflection mirrors (which will be hereinafter described as "deflection mirrors" whenever necessary) 5 are used to change the angle of the laser light 2 incident on the scanning lens 6, whereby a finite deflection area 7 is provided on the surface of the workpiece 4. Usually, the deflection mirrors 5 are implemented as two axes of a pair of deflection mirrors 5a and 5b and thus the deflection area 7 becomes a rectangular shape. Since the deflection mirrors 5a and 5b of two axes can be freely changed mutually in angle, the laser light 2 can be applied freely to every part in the deflection area 7. The workpiece 4 is fixed to a two-axis drive table 3 and upon completion of machining one deflection area 7, the workpiece 4 is moved by a distance equivalent to the length of one side of the deflection area 7 by means of the drive table 3, whereby the deflection area 7 can be consecutively developed on the surface of the workpiece 4 and the full surface of the workpiece 4 can be machined.

By the way, in laser beam machining, the material component of the workpiece 4 is removed by energy of the laser light 2 for machining. Thus, to perform good machining, the laser light 2 of proper energy needs to be applied. Thus, this kind of laser beam machine is provided with energy measurement means for setting the energy of the laser light 2 actually applied to the workpiece 4.

FIG. 7 shows an example of laser light energy measurement means provided for the laser beam machine in the related art. An energy measurement section 11 is placed at the tip of an air cylinder 16, whereby the energy measurement section 11 can be advanced to and retreated from a position opposed to the laser light emission side surface of the scanning lens 6 and only when energy is measured, the energy measurement section 11 is moved to the position opposed to the laser light emission side surface of the scanning lens 6 and energy measurement is conducted. The air cylinder 16 itself is attached and fixed to a column (not shown) to which a machining head is fixed.

The energy measurement means 11 in the related art thus placed is configured so that it can measure only the energy of laser light passing through the center of the scanning lens 6, namely, the energy of laser light applied to the center of the deflection area 7.

However, the laser beam machine using the deflection mirrors and the scanning lens machines usually the deflection area measuring about 50 mm square and thus measuring of only the energy of laser light passing through the center of the scanning lens as in the laser beam machine in the related art may be insufficient. The reason will be discussed in detail below:

In laser beam machining, the material component of a workpiece removed by the energy of laser light occurs as machining cuttings. In the laser beam machine using the deflection mirrors and the scanning lens, the machining cuttings are deposited on the laser light emission side surface of the scanning lens, whereby passage of the laser light is hindered and it may be made impossible to apply proper energy to the workpiece. Thus, as shown in FIG. 8, in the laser beam machine using the usual deflection mirrors 5 and the scanning lens 6, dirt prevention means of a dust collection duct 20, an air curtain 21, etc., is placed in the proximity of the scanning lens 6, where by machining cuttings 22 are prevented from being deposited on the laser light emission side surface of the scanning lens 6.

However, the bore of the laser light emission side surface of the scanning lens 6 used with this kind of laser beam machine has a comparatively large area in the neighborhood of $\phi$100 mm and thus if the above-described dirt prevention means is placed, a partial air flow becomes insufficient or stagnation occurs in the flow, so that a part where dirt prevention becomes incomplete occurs. With the use for a long term, the machining cuttings 22 are gradually deposited on the part and a state in which passage of the laser light 2 is hindered is entered. If the laser light 2 passes through the dirty part of the surface of the scanning lens 6 on which the machining cuttings 22 are deposited, absorption or scattering of the laser light 2 occurs due to the machining cuttings 22 and the energy arriving at the workpiece 4 is decreased and thus nonuniform energy occurs in the deflection area. Particularly with the dirt prevention means as shown in FIG. 8, shortage or stagnation of the flow easily occurs in the part near to the marginal portion of the scanning lens 6 in the proximity of the dust collection duct 20 and thus the machining cuttings 22 tend to be easily deposited on the part.

If dirt occurs in the part near to the marginal portion of the scanning lens 6 in such a manner that the machining cuttings 22 are deposited, in the vicinity of the center of the scanning lens 6, a sufficient flow exists and the above-described dirt prevention means acts effectively and thus deposition of the machining cuttings 22 can be prevented and dirt on the laser light emission side surface of the scanning lens 6 does not occur.

Under such circumstances, if only the energy of the laser light 2 passing through the center of the scanning lens 6 is measured and the energy is set, energy shortage occurs at the position in the deflection area corresponding to the dirty part on which the machining cuttings 22 are deposited, and good machining becomes difficult to perform at the position. Empirically, for example, if machining cuttings of epoxy resin of a component material of a printed wiring board are deposited on a part of the laser light emission side surface of the scanning lens 6, energy is lowered 20% or more in the part and if machining is performed without being aware of it, a part of the deflection area results in a machining failure. In such a case, it is necessary to remove dirt by cleaning the lower face of the scanning lens 6 in alcohol, etc., so as to make it possible to well machine the whole deflection area. Thus, if nonuniform energy in the deflection area occurs due to deposition of machining cuttings on the laser light emission side surface of the scanning lens 6, the energy state becomes good if appropriate maintenance of cleaning, etc., is conducted. However, the development degree of dirt varies depending on the machining contents and thus the appropriate maintenance timing cannot be determined. If the maintenance frequency is raised, a problem of hindering productivity also arises.

As described above, in the laser beam machine in the related art, only the energy of the laser light passing through the center of the scanning lens is measured and thus nonuniform energy in the deflection area caused by partial dirt on the laser light emission side surface of the scanning lens cannot be grasped and a machining failure may occur. Particularly, in this kind of laser beam machine, high volume production is performed in a short time and thus once a machining failure occurs as described above, it is developed to a heavy loss. Thus, to grasp nonuniform dirt of the scanning lens is a problem.

The invention is intended for solving the problems as described above and it is an object of the invention to provide a laser beam machine wherein nonuniform energy in a deflection area is detected, whereby partial dirt on the surface of a scanning lens is determined and the operator is prompted to perform appropriate maintenance such as cleaning of the surface of the scanning lens for providing stable machining quality.

DISCLOSURE OF THE INVENTION

According to the invention, there is provided a laser beam machine comprising a scanning lens for gathering laser light deflected by a deflection mirror on a workpiece for applying the laser light to a plurality of positions in a deflection area using the above-mentioned deflection mirror and the above-mentioned scanning lens and machining the workpiece, and comprising energy measurement means for measuring energy of the laser light applied to a plurality of different measurement positions in the above-mentioned deflection area.

Therefore, the energy of the laser light applied to a plurality of different positions in the deflection area can be measured, occurrence of partial energy lowering depending on the laser light application position, caused by dirt of the scanning lens can be known, and appropriate maintenance is executed based on the information, whereby it is made possible to perform stable machining over a long term without causing a machining failure to occur.

In the laser beam machine of the invention, the energy measurement means is placed in a drive table for placing a workpiece thereon and moving.

Therefore, the energy of the laser light applied to an arbitrary position in the deflection area can be measured without providing an additional mechanism for moving the energy measurement means only.

The laser beam machine of the invention comprises comparison means for comparing the measurement value at each measurement position with a preset tolerance.

Therefore, partial energy lowering at a specific position in the deflection area can be detected and grasped with accuracy independently of the magnitude of the absolute value of the energy of the laser light set from the machining conditions.

The laser beam machine of the invention comprises alarm generation means for outputting an alarm based on the measurement value and the preset tolerance.

Therefore, the worker can recognize dirt on the surface of the scanning lens and can perform appropriate maintenance such as cleaning of the surface of the scanning lens.

The laser beam machine of the invention comprises schedule means for conducting energy measurement on a predetermined schedule.

Therefore, forgetting about conducting energy measurement can be prevented.

The laser beam machine of the invention comprises storage means for storing the measurement value.

Therefore, time-series change in the applied energy, etc., can be grasped and the appropriate maintenance timing, etc., can be derived based on the stored measurement value data.

The laser beam machine of the invention comprises display means for displaying a graph of the measurement values of the energy of the laser light measured.

Therefore, time-series change in the-applied energy, the difference depending on the light application position, and the like can be grasped and an appropriate maintenance procedure, etc., can be derived based on the displayed measurement value data.

In the laser beam machine of the invention, a recess part is made in the placement face of the drive table on which the workpiece is placed and the energy measurement means is placed in the recess part.

Therefore, the energy measurement means is prevented from interfering with the members, etc., attached to the surrounding of a machining head section.

In the laser beam machine of the invention, means for adjusting the height position of the scanning lens so that the laser light is applied in a defocus state is provided for the energy measurement means.

Therefore, it is made possible to make laser light of appropriate strength incident on the energy measurement means and damage to the energy measurement means caused by incidence of laser light of too high strength can be prevented.

In the laser beam machine of the invention, the energy measurement means comprises a moving protective cover relative to a laser light reception section.

Therefore, machining cuttings, etc., can be prevented from being deposited on the laser light reception section and stable energy measurement can be conducted over a long term.

BEST MODE FOR CARRYING OUT THE INVENTION

First Embodiment

A laser beam machine according to a first embodiment of the invention will be discussed with FIGS. 1 to 5.

Figure 1:
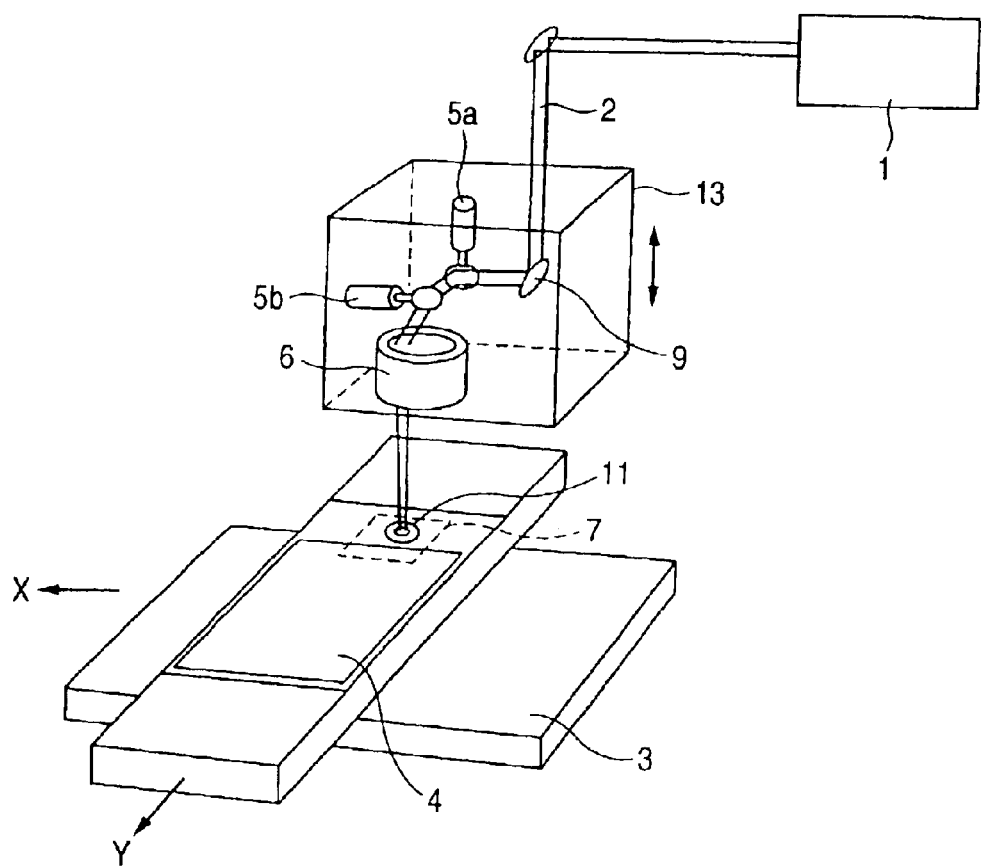
FIG. 1 is a drawing of a schematic configuration of a laser beam machine according to an embodiment of the invention.

FIG. 1 is a drawing of a schematic configuration of the laser beam machine according to the first embodiment of the invention. In FIG. 1, components denoted by reference numerals 1 to 7 are identical with or similar to those of the laser beam machine in the related art and therefore will not be discussed again in detail. Numeral 9 denotes a turn mirror and numeral 13 denotes a machining head section.

Deflection mirrors 5a and 5b, a scanning lens 6, and the turn mirror 9 are built in the machining head section 13 that can be moved in an up and down direction, namely, a direction perpendicular to the plane of a drive table 3. The deflection mirrors 5a and 5b are implemented as two axes and the angle of laser light 2 incident on the scanning lens 6 is changed, whereby a finite deflection area 7 shaped like a rectangle is provided on the surface of a workpiece 4. Since the deflection mirrors 5a and 5b of two axes can be freely changed mutually in angle, the laser light 2 can be applied freely to every position in the deflection area 7. The workpiece 4 is fixed to a two-axis drive table 3 by vacuum absorption and upon completion of machining one deflection area 7, the workpiece 4 is moved by a distance equivalent to the length of one side of the deflection area 7 by means of the drive table 3, whereby the deflection area 7 can be consecutively developed on the workpiece 4 and the full surface to be machined, of the workpiece 4 can be machined.

Numeral 11 denotes an energy measurement section as energy measurement means built in at a position avoiding interference with the workpiece 4 at one end of the drive table 3. The drive table 3 is assumed to move in a sufficiently large operation range to enable the energy measurement section 11 to measure energy of the whole deflection area 7 as well as in the essential machining range of the workpiece 4. The energy measurement section 11 is thus attached to one end of the drive table 3 and can be moved integrally with the drive table 3, so that the energy of laser light applied to an arbitrary position in the deflection area 7 can be measured without providing an additional mechanism for moving the energy measurement section 11 only.

Figure 2:
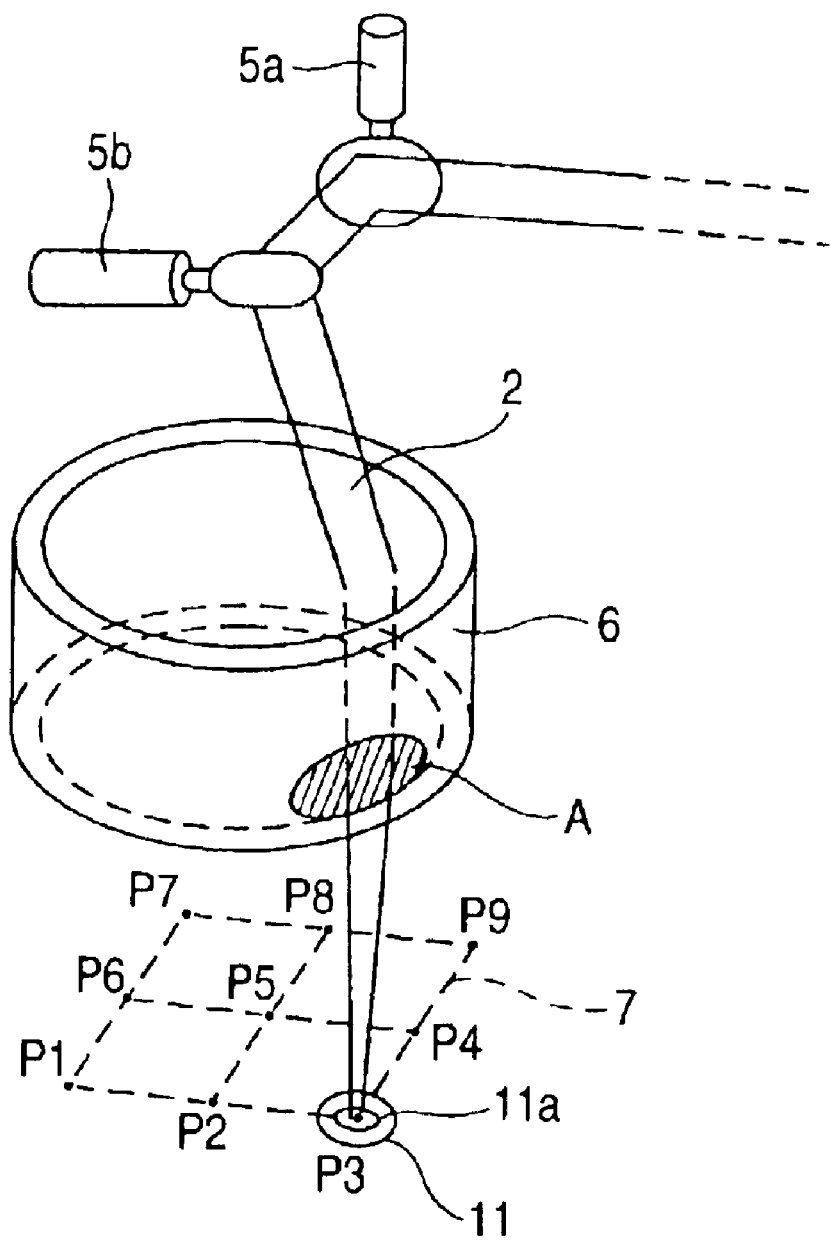
FIG. 2 is a schematic drawing to describe the relationship between the deflection area of a scanning lens of the laser beam machine according to the embodiment of the invention and measurement positions of an energy measurement section.

FIG. 2 is a schematic drawing to describe the relationship between the deflection area of the scanning lens of the laser beam machine according to the embodiment and the measurement positions of the energy measurement section.

The case where the deflection area 7 is divided like a grid according to a Cartesian coordinate system to determine positions to measure the energy of the laser light 2 as for the deflection area is shown. The inside of the deflection area 7 is divided like a grid and the drive table 3 is moved so that a light reception section 11a of the energy measurement section 11 moves to each measurement position Pn (n=1, 2, . . . 9), whereby the energy of the laser light 2 applied to a predetermined position in the deflection area 7 can be measured. The energy at the predetermined measurement position is thus measured, whereby the dirty state of a large number of parts of the scanning lens 6 can be grasped in a short time.

In this case, it is desirable that setting of the intervals of the grid should be able to be changed whenever necessary in response to the diameter of the scanning lens 6, the magnitude of the laser light 2 passing through the scanning lens 6, etc.

In FIG. 2, when the laser light is applied to measurement position P3 point in the deflection area 7, if machining cuttings 22 are deposited on the corresponding part A of the scanning lens 6 through which the laser light passes, the laser light 2 passing through the corresponding part A undergoes absorption or scattering and thus the measured energy value is low as compared with the energy measurement value at any other measurement position, so that dirt of the corresponding part A of the scanning lens 6 can be detected.

In the example, the case where the deflection area 7 is divided like a grid has been described, but the deflection area 7 may not necessarily be divided like a grid and a plurality of measurement positions corresponding to the parts of the scanning lens 6 where dirt easily occurs empirically may be predetermined.

In the example, the case where the measurement positions are predetermined has been described, but the measurement position may be changed appropriately as required at each measurement time, needless to say.

In the above-described example, the case where the number of light reception sections 11a of the energy measurement section 11 placed in the drive table 3 is one and the light reception section 11a is moved corresponding to measurement position Pn provided by assumptively dividing the deflection area 7 like a grid has been shown, but it is needless to say, and also possible to provide a plurality of light reception sections 11a and guide the laser light 2 to the plurality of light reception sections 11a by motion of the deflection mirrors 5a and 5b.

Figure 3:
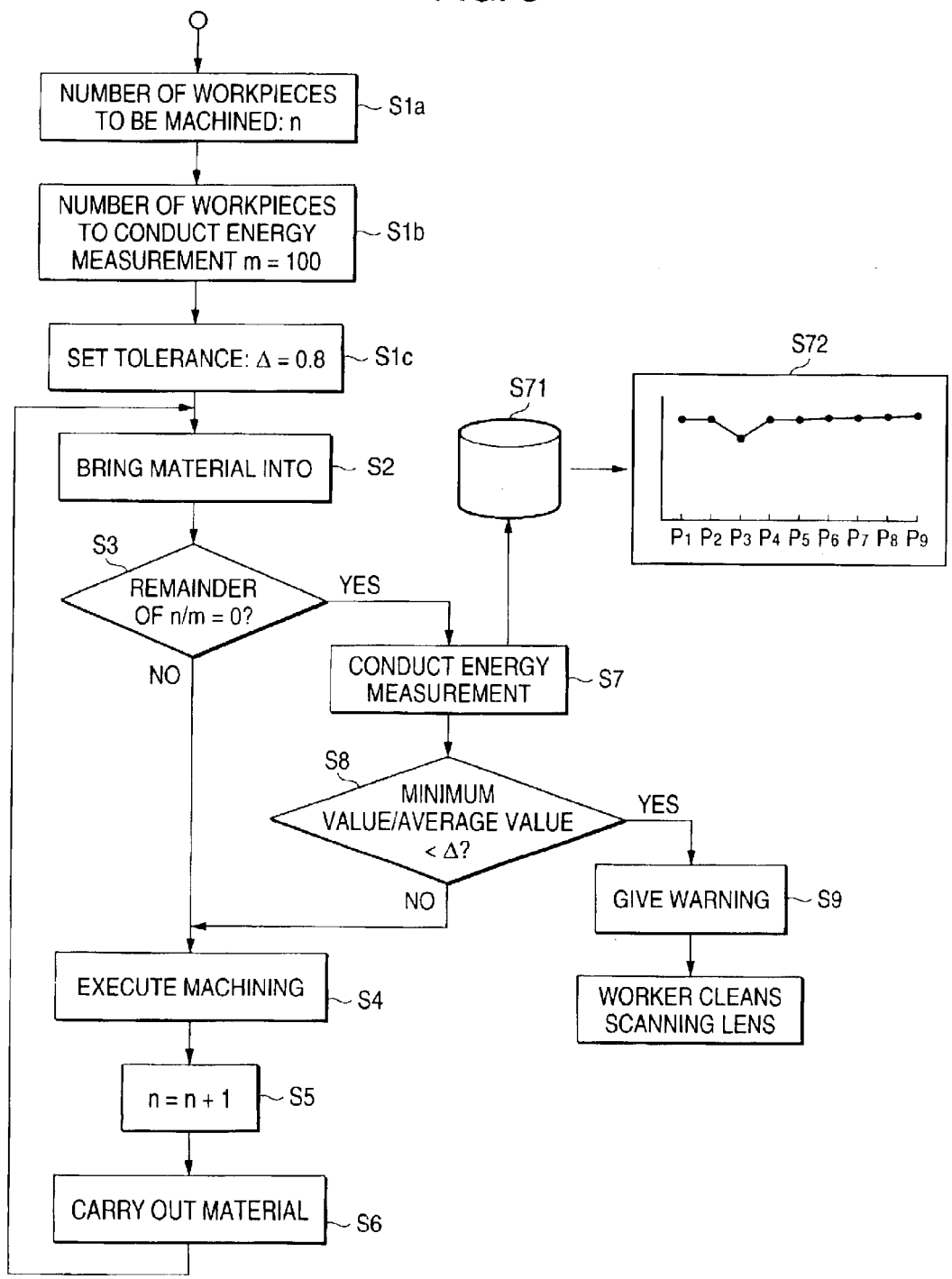
FIG. 3 is an operation flowchart of the laser beam machine according to the embodiment of the invention.

FIG. 3 is an operation flowchart of the laser beam machine according to the embodiment and shows an example of automatically conducting energy measurement of laser light applied to a plurality of different positions in the deflection area described above each time a predetermined number of workpieces are machined.

One workpiece at a time is brought onto the drive table and is machined and upon completion of machining, is carried out. Counter n of the number of workpieces to be machined, the number of workpieces m to conduct energy measurement, and predetermined tolerance Δ are preset (S1a, S1b, and S1c) and each time a workpiece is machined, n is incremented (S5). When the remainder of calculation n/m becomes 0 (S3), energy measurement is conducted (S7).

Next, the measurement values of energy measured at different measurement positions in the deflection area or the calculation result of the measurement values is compared with the predetermined tolerance, whereby lowering of applied energy can be detected. In the example shown in FIG. 3, whenever 100 workpieces are machined, the energy of laser light at each measurement position in the deflection area is measured, minimum value/average value as for the measurement values is found, and the case where the preset tolerance Δ is exceeded is detected. For example, Δ is set to 0.8 and whether or not minimum value/average value<0.8 is determined (S8). If a measurement position where the energy is lowered 20% or more relative to the average value of the energy measurement values of the whole deflection area occurs, an alarm is output, for example, a warning lamp is turned on or a warning sound is produced through a controller (not shown) of the laser beam machine, prompting the operator to clean the scanning lens, etc., (S9).

As described above, the method of calculating the measurement values at the different measurement positions of the deflection area, finding the energy lowering amount in percentage, and comparing with the tolerance is used, whereby significant energy lowering at a specific position in the deflection area can be detected and grasped with accuracy independently of the magnitude of the absolute value of energy of laser light set from the machining conditions.

The energy measurement value at each measurement position in the deflection area each time is stored in a storage unit in the controller of the laser beam machine (S71) and a graph of measured energy is displayed on an operation screen in the controller as required (S72). By providing such means for storing the data and displaying a graph, what part of the scanning lens is dirty can be understood and time-series change in the energy in each part can be grasped and the appropriate timing for cleaning the scanning lens can be known.

Machining is executed based on the operation flowchart as described above, whereby machining can be performed while appropriate maintenance is conducted without a machining failure caused by energy lowering caused by deposition of machining cuttings on the scanning lens, so that it is made possible to perform stable high volume machining over a long term. It is also made possible to obtain information of the appropriate maintenance timing, etc., from the stored data and necessary minimum maintenance can be conducted for suppressing the adverse effect on productivity. In FIG. 3, the predetermined schedule is determined based on the number of workpieces to be machined; for example, in addition, it may be executed based on the integration time of machining the workpieces.

Figure 4:
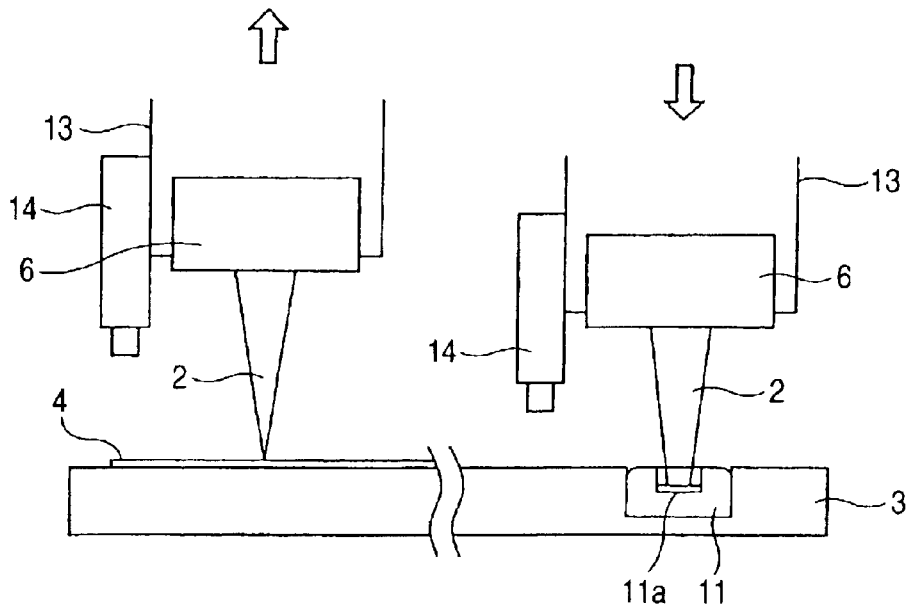
FIGS. 4(a) and 4(b) are schematic drawings to describe the attachment position of the energy measurement section of the laser beam machine according to the embodiment of the invention.

FIG. 4 is a schematic drawing to describe the attachment position of the energy measurement section 11 of the laser beam machine according to the embodiment. The energy measurement section 11 is attached to the drive table 3 as described above. To thus attach the energy measurement section 11 to the drive table 3, it is necessary to consider interference between the members such as an observation camera lens 14 attached to the machining head 13 and the energy measurement section 11 when the drive table 3 is moved. Then, the drive table 3 is formed with a recess part and the energy measurement section 11 is attached to a lower position than the surface of the drive table 3, namely, the placement face of a workpiece (not shown). The energy measurement section 11 is thus attached to a lower position than the surface of the drive table 3, whereby interference with the observation camera lens 14, etc., attached to the surrounding of the machining head section 13 can be avoided.

To machine the workpiece 4, the laser light 2 is gathered in the proximity of the surface of the drive table 3 and thus if the energy measurement section 11 conducts energy measurement in the state intact, it is feared that the light reception section 11a of the energy measurement section 11 may be damaged because the energy density is too high.

Then, when energy is measured, the machining head section 13 is moved in an up and down direction relative to the surface of the drive table 3, whereby the height position of the scanning lens 6 is changed and the laser light 2 is applied to the light reception section 11a in a defocus state. The means for thus adjusting the height position of the scanning lens 6 at the machining time and the measuring time (not shown) is provided, whereby it is made possible to conduct stable energy measurement over a long term without damage to the light reception section 11a of the energy measurement section 11. In the embodiment, it is needless to say that at the measuring time, the scanning lens 6 is lowered for providing the defocus state, but may be raised for providing the defocus state, needless to say.

Figure 5:
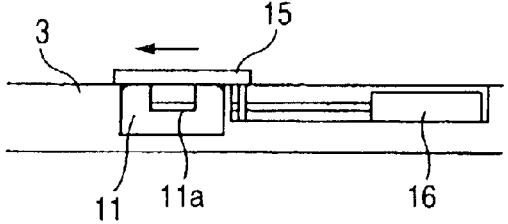
FIGS. 5(a) and 5(b) are schematic drawings to describe a protection mechanism of the energy measurement section of the laser beam machine according to the embodiment of the invention.
Figure 5:
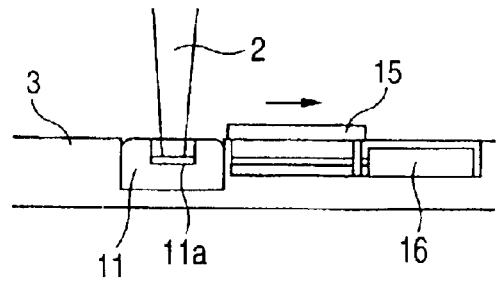
Figure 6:
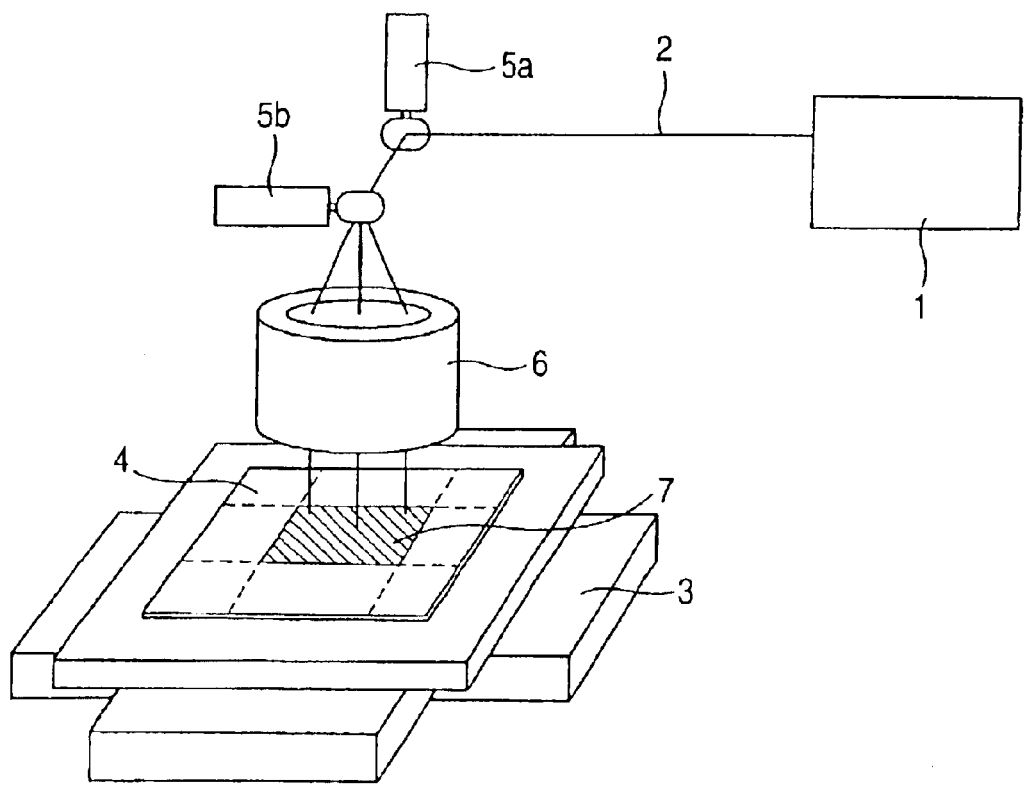
FIG. 6 is a drawing of the configuration of a laser beam machine in a related art.
Figure 7:
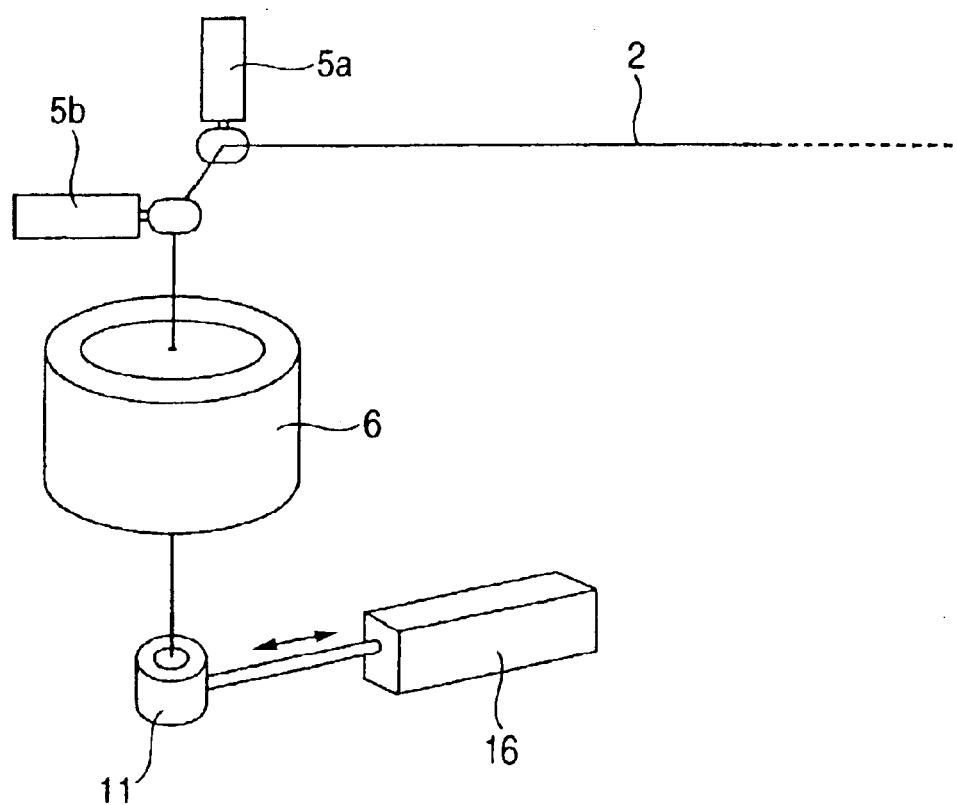
FIG. 7 is a schematic representation of energy measurement means of laser light of the laser beam machine in the related art.
Figure 8:
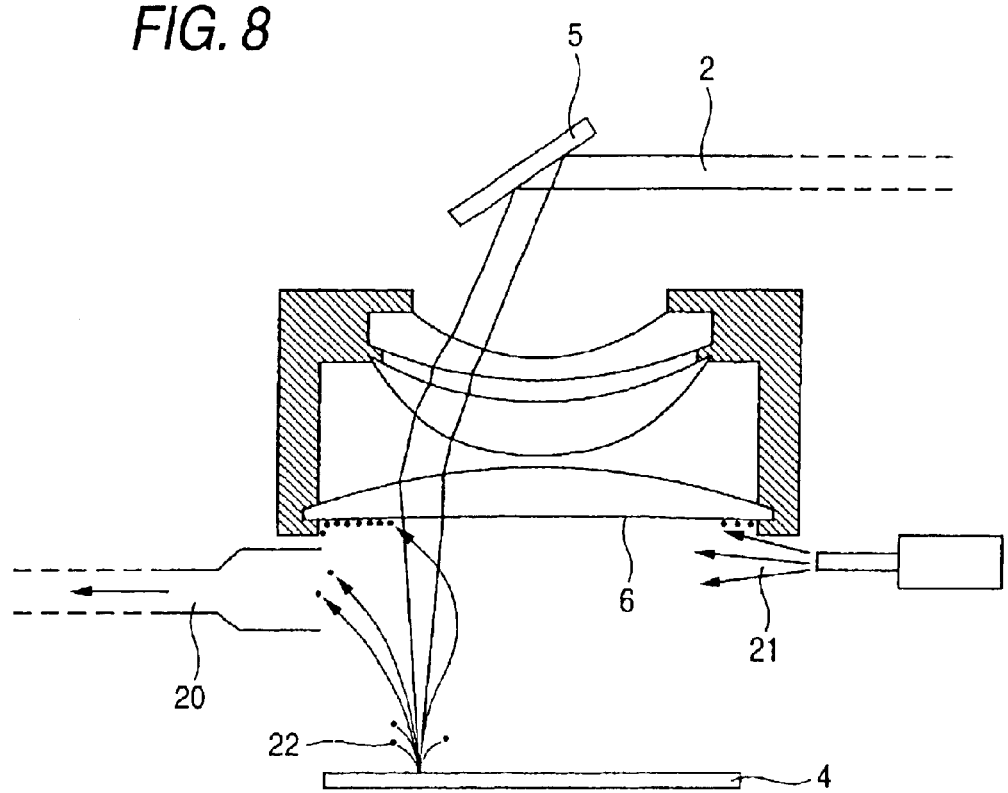
FIG. 8 is a schematic representation to describe deposition of machining cuttings on a scanning lens.

FIG. 5 is a schematic drawing to describe a protection mechanism of the energy measurement section 11 of the laser beam machine according to the embodiment. In FIG. 5, numeral 15 denotes a protective cover for protecting the energy measurement section 11a and numeral 16 denotes an opening/closing drive mechanism of the protective cover 15, made of an air cylinder. The moving protective cover 15 is thus provided for the energy measurement section 11 and usually at the workpiece (not shown) machining time, etc., the top face of the energy measurement section 11 is covered with the protective cover 15 for protecting the energy measurement section 11, as shown in FIG. 5(a). Only when energy is measured, the protective cover 15 is opened by the opening/closing drive mechanism 16, as shown in FIG. 5(b), whereby machining cuttings, etc., can be prevented from being deposited on the light reception section 11a of the energy measurement section 11 and it is made possible to conduct stable energy measurement over a long term.

Industrial Applicability

As described above, the laser beam machine according to the invention is suited for use in machining a multi-layer circuit board used with a portable information electronic machine, etc., for example.

What is claimed is:

1. A laser apparatus, comprising;
    a laser source producing at least one light beam;
    a beam deflection unit for altering a path of said beam within a defined finite area;
    a scanning lens arranged downstream of said beam deflection unit, for directing said beam to a target location within said defined area; and
    an energy measurement system capable of measuring an energy level of said beam at a plurality of positions within said defined area, and detecting a dirty area of said scanning lens based on said measurements.

2. The laser apparatus as claimed in claim 1, wherein said energy measurement system is placed on a movable drive table.

3. The laser apparatus as claimed in claim 1, further comprising:
    comparison means for comparing a measurement value at each of said positions with a preset tolerance.

4. The laser apparatus as claimed in claim 3, further comprising:
    alarm generation means for outputting an alarm based on the measurement value and the preset tolerance.

5. The laser apparatus as claimed in claim 1, further comprising:
    schedule means for causing said energy measurement system to conduct energy measurement on a predetermined schedule.

6. The laser apparatus as claimed in claim 3, further comprising:
    storage means for storing the measurement values.

7. The laser apparatus as claimed in claim 3, further comprising:
    display means for displaying a graph of the measurement values.

8. The laser apparatus as claimed in claim 2, wherein a recess is made in the placement face of the drive table on which a workpiece is placed, and said energy measurement system is placed in the recess.

9. The laser apparatus as claimed in claim 1, further comprising:
    means for adjusting the height position of said scanning lens so that the laser light is applied in a defocused state to said energy measurement system.

10. The laser apparatus as claimed in claim 1, wherein said energy measurement system comprises:
    a moving protective cover relative to a laser light reception section.

* * * * *